United States Patent
Iwanaga (10) Patent No.: US 6,249,504 B1
(45) Date of Patent: Jun. 19, 2001

(54) ANTI-VIBRATION MECHANISM AND DISK DRIVE DEVICE USING THE SAME

(75) Inventor: Atsushi Iwanaga, Miyagi-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 0 days.

(21) Appl. No.: 09/061,588

(22) Filed: Apr. 16, 1998

(30) Foreign Application Priority Data

Apr. 25, 1997 (JP) .................................................. 9-109851

(51) Int. Cl.⁷ .................................................. G11B 33/08
(52) U.S. Cl. .................................................. 369/247
(58) Field of Search .................................. 369/247, 263; 360/97.02; 267/136, 140.3, 158, 175, 177

(56) References Cited

U.S. PATENT DOCUMENTS

| | | | |
|---|---|---|---|
| 4,325,131 | * | 4/1982 | Takeda ................................ 369/255 |
| 4,462,097 | * | 7/1984 | Janada et al. ....................... 369/248 |
| 4,561,085 | | 12/1985 | Funabashi ........................... 369/77.1 |
| 4,631,716 | * | 12/1986 | Ikedo et al. ......................... 369/75.2 |
| 4,772,974 | * | 9/1988 | Moon et al. ........................... 360/98 |
| 4,812,932 | | 3/1989 | Hishinuma et al. ............... 360/97.01 |
| 5,131,619 | | 7/1992 | Daughterty et al. .................. 248/635 |
| 5,659,380 | * | 8/1997 | Kobayashi .......................... 351/110 |
| 5,668,791 | * | 9/1997 | Yamada et al. ...................... 369/247 |

FOREIGN PATENT DOCUMENTS

| | | |
|---|---|---|
| 0293631 | 7/1988 | (JP) . |
| 02-137181 | 5/1990 | (JP) . |
| 10-184653 | 7/1998 | (JP) . |

* cited by examiner

*Primary Examiner*—Brian E. Miller
*Assistant Examiner*—Kenneth W. Fields
(74) *Attorney, Agent, or Firm*—Brinks Hofer Gilson & Lione (57) ABSTRACT

An anti-vibration mechanism includes: a first chassis 1; a second chassis 2 opposed to the first chassis; vibration proof members 4 mounted to the second chassis; support members 3 for mounting the vibration proof members to the first chassis by insertion through central holes 4a of the vibration proof members; and elastic members 5 arranged between the first chassis and the support members, wherein the distance between the first chassis and the second chassis can be adjusted by means of the elastic members.

8 Claims, 7 Drawing Sheets

ANTI-VIBRATION MECHANISM AND DISK DRIVE DEVICE USING THE SAME

BACKGROUND OF THE INVENTION

1. Field of the Invention

The present invention relates to an anti-vibration mechanism and a disk drive device using the same and, more specifically, to an anti-vibration mechanism suitable for use in a small-sized drive device for driving disks, such as CDs (compact disks), CD-ROMs (CD-read only memories), MO (magneto-optical memories) and DVDs (digital versatile disks), and a disk drive using the same.

2. Description of the Related Art

Generally speaking, external vibrations, impacts, etc. are applied to an optical or a magnetic disk drive device. Such vibrations, etc. applied during reproduction cause reading errors to thereby generate errors in reading data, etc.

Figure 7:
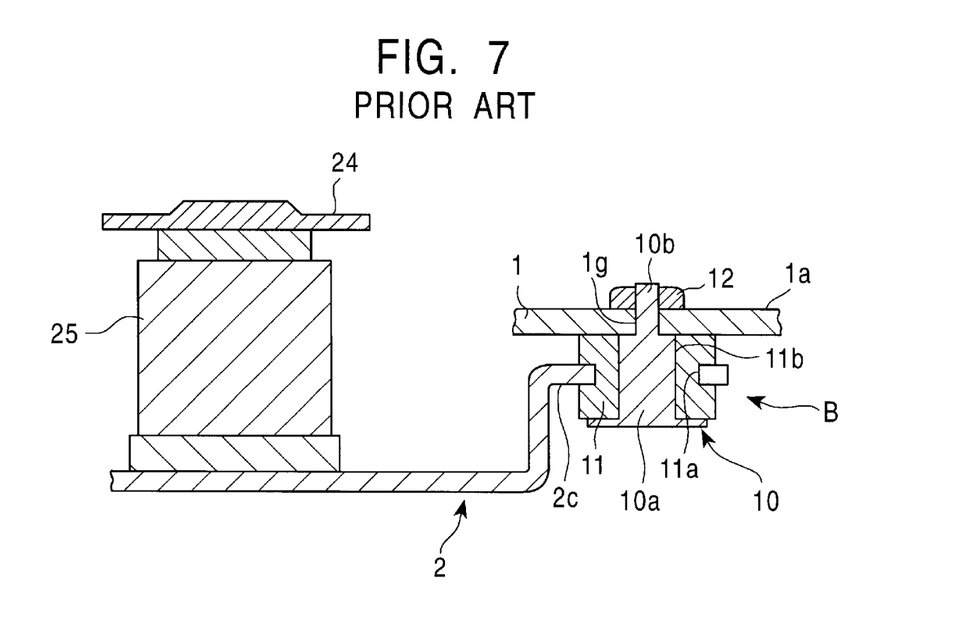
FIG. 7 is an essential-part sectional view illustrating a conventional anti-vibration mechanism.
Figure 8:
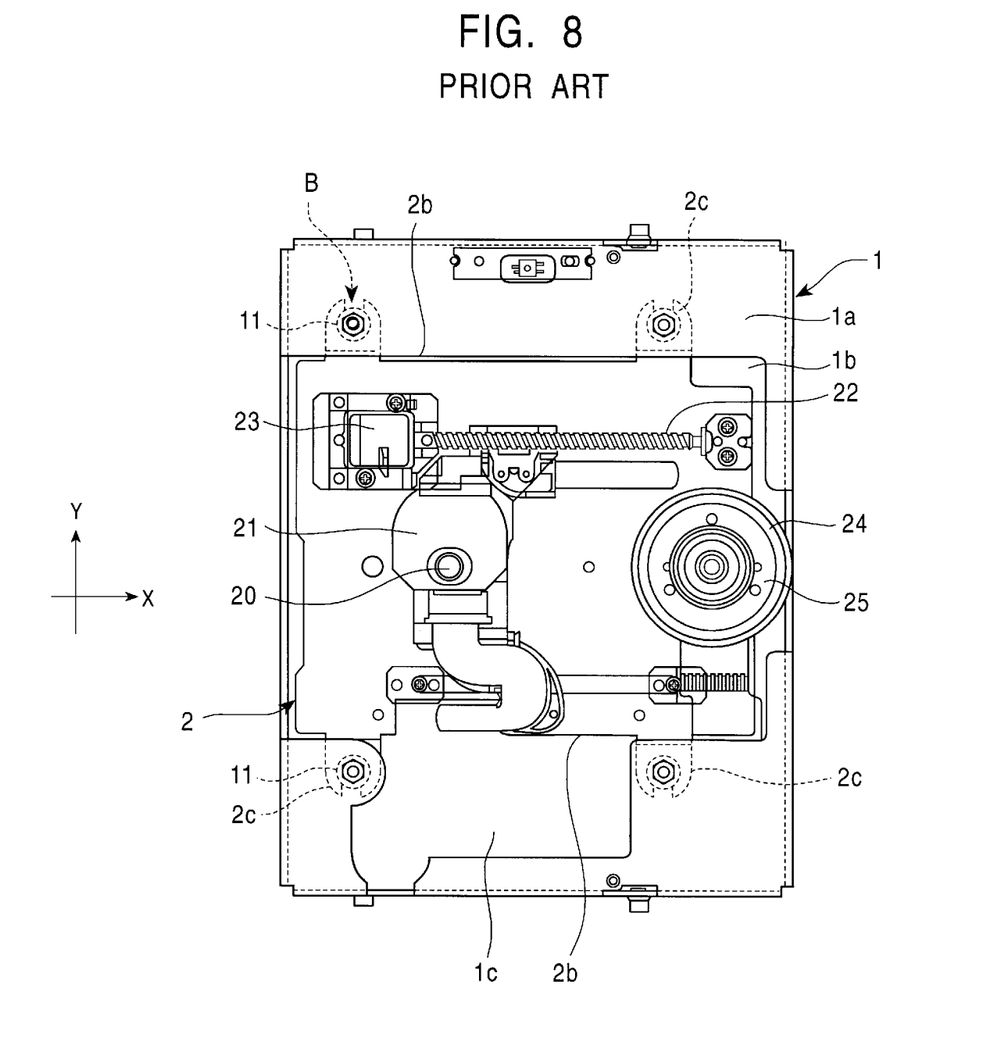
FIG. 8 is a plan view showing a conventional disk drive device.
Figure 9:
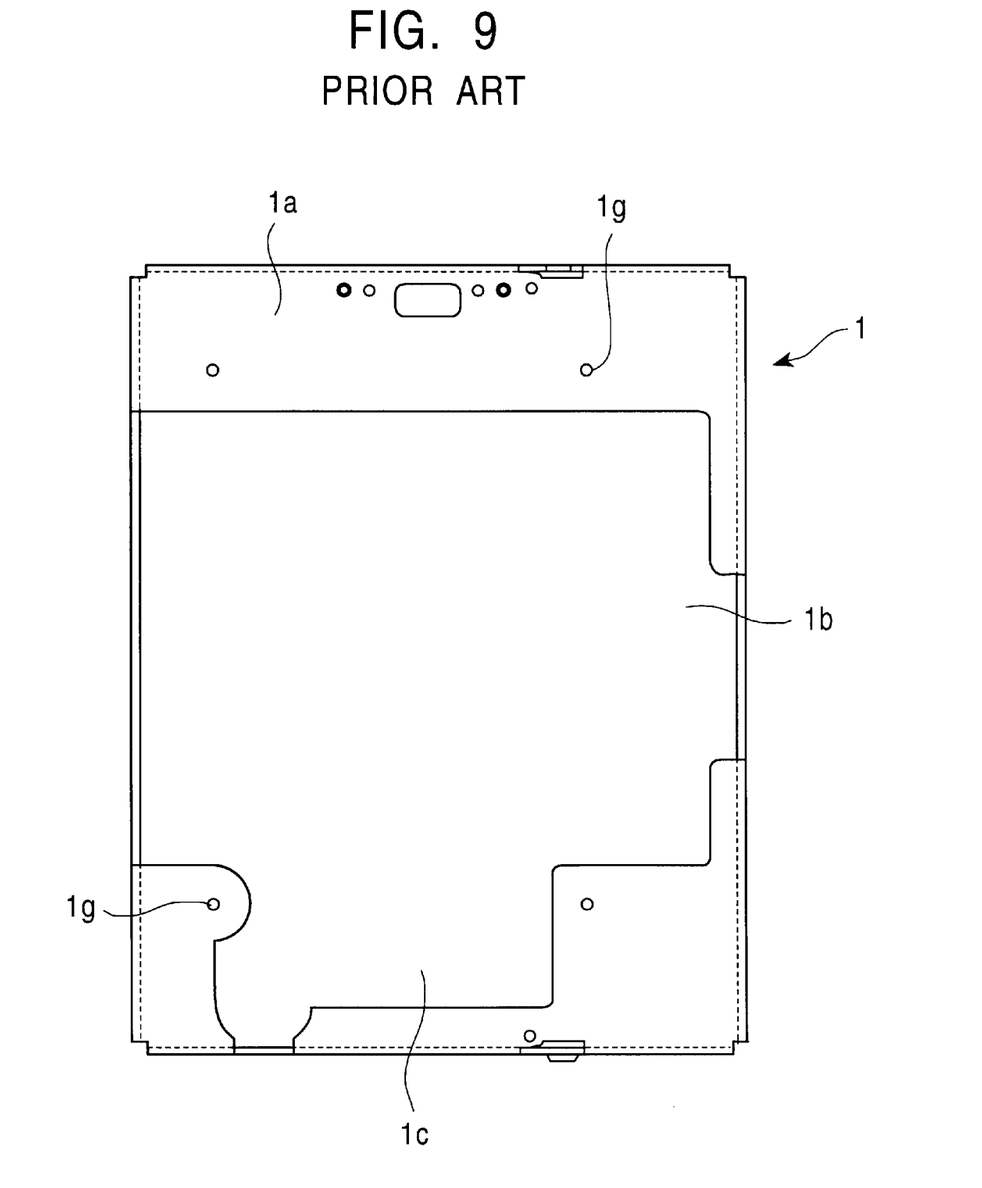
FIG. 9 is a plan view showing a conventional first chassis.

Conventionally, such errors in reading data due to external vibrations, etc. have been prevented by a structure as shown in FIGS. 7 through 9. FIG. 7 is an essential-part sectional view illustrating a conventional anti-vibration mechanism; FIG. 8 is a plan view showing a conventional disk drive device; and FIG. 9 is a plan view showing a first chassis of a conventional disk drive device. As shown in FIGS. 7 through 9, this disk drive device is at least equipped with a first chassis 1 supported by an outer case (not shown), and a second chassis 2 which carries a rotation drive motor 25 to which a turntable 24 is mounted, a reproduction head 20 consisting of an optical head or the like, etc.

Formed in the upper wall 1a on the upper side of the first chassis 1 are a substantially rectangular first hole 1b, situated at the center thereof, a substantially rectangular second hole 1c connected to the first hole 1b, and a plurality of circular mounting holes 1g arranged along the longitudinal side edges of the first hole 1b (for example, two on either side, i.e., four in total).

Arranged on the second chassis 2 are a carriage 21 carrying the reproduction head 20, a screw shaft 22 for driving this carriage 21 in the X-direction, a stepping motor 23 for rotating this screw shaft 22 intermittently, and the rotation drive motor 25, to which the turntable 24 is mounted. Further, on opposing longitudinal side edges 2b of the second chassis 2, there are formed a plurality of (for example, two on either side, i.e., four in total) mounting members 2c upwardly bent into an L-shape and having a fork-like forward-end configuration.

The first chassis 1 and the second chassis 2 are arranged so as to be opposed to each other, and the positions at which the plurality of mounting holes 1g of the first chassis 1 are formed respectively correspond to the positions at which the plurality of mounting members 2c of the second chassis 2 are formed, the two chassis 1 and 2 being attached to each other at these positions. The reproduction head 20, the carriage 21, the rotation drive motor 25, etc. are exposed through the first hole 1b of the first chassis 1.

In this disk drive device, the second chassis 2 is suspended from the first chassis 1 by means of an anti-vibration mechanism B using a plurality of (for example, four) vibration proof rubber members, whereby external vibrations, etc. from the first chassis 1 are prevented from being transmitted to the second chassis 2.

FIG. 7 is an essential-part sectional view illustrating a conventional anti-vibration mechanism B. The fork-shaped mounting member 2c of the second chassis 2 is engaged with a peripheral groove 11a of a cylindrical vibration proof rubber member 11. Passed through the circular mounting hole 1g of the first chassis 1 is a screw portion 10b provided on a support portion 10a of a cylindrical bolt 10 passed through a central hole 11b of the vibration proof rubber member 11. The screw portion 10b is threadedly engaged with a hexagon nut 12, whereby the bolt 10 is fastened to the mounting hole 1g, thereby enabling the second chassis 2 to be suspended from the first chassis 1 through the intermediation of the vibration proof rubber member 11.

When the second chassis 2 is thus suspended from the first chassis 1 through the intermediation of the vibration proof rubber members 11 constituting the plurality of anti-vibration mechanisms B, the height dimension between the upper wall (upper surface) of the first chassis 1 and the upper surface of the turntable 24, mounted to the rotation drive motor 25 arranged on the second chassis 2, is definitely determined.

The height dimension between the upper wall (upper surface) of the first chassis 1 and the upper surface of the turntable 24, definitely determined, cannot be adjusted.

Due to their nature, the vibration proof rubber members 11 must be held in a state in which no such stress as torsion or compression is applied thereto since it is difficult to maintain the requisite dimensional accuracy in machining and a predetermined spring constant must be maintained.

The positioning of the first chassis 1 with respect to the second chassis 2 in the X and Y-directions is effected by inserting the cylindrical bolts 10, which extend through the central holes 11b of the plurality of vibration proof rubber members 11, into the circular mounting holes 1g of the first chassis 1 and threadedly engaging the bolts 10 thus inserted with the hexagon nuts 12.

Nowadays, in disk drive devices required to be thinner and disk drive devices equipped with a changer mechanism in which a plurality of disks are stacked together, there are heavier demands for high accuracy in the dimensions of each member constituting the drive device. In the above-described conventional anti-vibration mechanism B, however, the distance between the first chassis 1 and the second chassis 2 is determined by the machining dimension of the vibration proof rubber members (vibration proof members) arranged between the first chassis 1 and the second chassis 2. This leads to a problem in that it is difficult to maintain the requisite dimensional accuracy of the vibration proof rubber members, and, consequently, it is difficult to maintain high accuracy in the distance between the first chassis 1 and the second chassis 2.

Further, the mounting of the vibration proof rubber members to the first chassis is effected by forcing the mounting bolts into the central holes of the vibration proof rubber members and threadedly engaging the bolts with the hexagon nuts, so that, when engaging the hexagon nuts with the bolts, the bolts rotate with the nuts, with the result that torsional stress is applied to the vibration proof rubber members into which the bolts have been forced. This stress applied to the vibration proof rubber members causes variation in the spring constant of the vibration proof rubber members to be generated, with the result that a desired anti-vibration performance cannot be achieved.

Further, due to the deterioration in elasticity as a result of change with time, the height of these vibration proof rubber members increases (i.e., they extend further downwards), so that the position of the turntable mounted to the second chassis is also lowered. Due to the construction in which the distance between the first chassis and the second chassis cannot be adjusted, nothing can be done about this change with time.

Further, the above change with time does not always occur in the same manner in the four vibration proof rubber members. Variation can sometimes occur between the four vibration proof rubber members, with the result that there is variation in the heights of the vibration proof rubber members. As a result, the parallelism of the turntable cannot be maintained, so that the disk is tilted.

Further, when mounting the second chassis to the first chassis, the screw portions of the cylindrical mounting bolts are passed through the circular mounting holes provided in the first chassis, and the hexagon nuts are threadedly engaged therewith. In this mounting operation, the screw portions of the cylindrical bolts are passed through the circular mounting holes, with the result that a slight clearance is generated between the diameter of the mounting holes and the diameter of the screw portions. Due to this clearance, there is generated a slight positional deviation of the second chassis in the X and Y-directions with respect to the first chassis, so that the position of the turntable mounted to the second chassis is not accurately determined with respect to the first chassis.

Further, in view of the spring constant, a relatively soft rubber material is selected as the material of the vibration proof rubber members, so that these vibration proof rubber members are subject to deformation. The weight of the rotation drive motor, the carriage carrying the reproduction head, etc. arranged on the second chassis, which is suspended from the first chassis through the intermediation of the vibration proof rubber members, is not uniformly loaded on the four vibration proof rubber members, and due to this difference in load, variation in the deformation of the vibration proof rubber members is generated.

Due to this variation in the deformation of the vibration proof rubber members, variation in height dimension, i.e., the distance between the first chassis and the second chassis, is generated between the positions where the vibration proof rubber members are arranged. As a result, it sometimes happens that the horizontality of the upper surface of the turntable, mounted to the second chassis, with respect to the upper surface (upper wall) of the first chassis cannot be maintained, with the result that the disk placed on the turntable cannot be horizontally rotated.

SUMMARY OF THE INVENTION

Accordingly, it is an object of the present invention to provide, in view of the problems of the above-described anti-vibration mechanism using vibration proof rubber members, an anti-vibration mechanism in which high accuracy in the distance between the first chassis and the second chassis can be maintained and in which no torsional stress is applied to the vibration proof rubber members, and a disk drive device using such an anti-vibration mechanism.

In accordance with the present invention, there is provided an anti-vibration mechanism comprising: a first chassis; a second chassis opposed to the first chassis; vibration proof members mounted to the second chassis; support members for mounting the vibration proof members to the first chassis; and elastic members arranged between the first chassis and the support members, wherein the second chassis is suspended from the first chassis through the intermediation of the vibration proof members and wherein the distance between the first chassis and the second chassis can be adjusted by means of the elastic members.

In the anti-vibration mechanism of the present invention, deformed screw portions are formed in the support members, and mounting holes having a configuration corresponding to the deformed screw portions are formed in the first chassis, and the deformed screw portions are passed through the mounting holes to thereby mount the vibration proof members to the first chassis.

In the anti-vibration mechanism of the present invention, flat surfaces are provided on the deformed screw portions, and a plurality of the above-mentioned mounting holes are formed, with the orientations of flat surfaces of at least two of the mounting holes being arranged so as to be orthogonal to each other.

In the anti-vibration mechanism of the present invention, the elastic members are spring washers.

In accordance with the present invention, there is further provided a disk drive device which is equipped with an anti-vibration mechanism comprising: a first chassis: a second chassis carrying a rotation drive motor to which a turntable is mounted and a reproduction head; vibration proof members mounted to the second chassis; support members for mounting the vibration proof members to the first chassis; and elastic members arranged between the first chassis and the support members, wherein the second chassis is suspended from the first chassis through the intermediation of the vibration proof members and wherein the distance between the first chassis and the turntable can be adjusted by means of the elastic members.

DESCRIPTION OF THE PREFERRED EMBODIMENT

Figure 1:
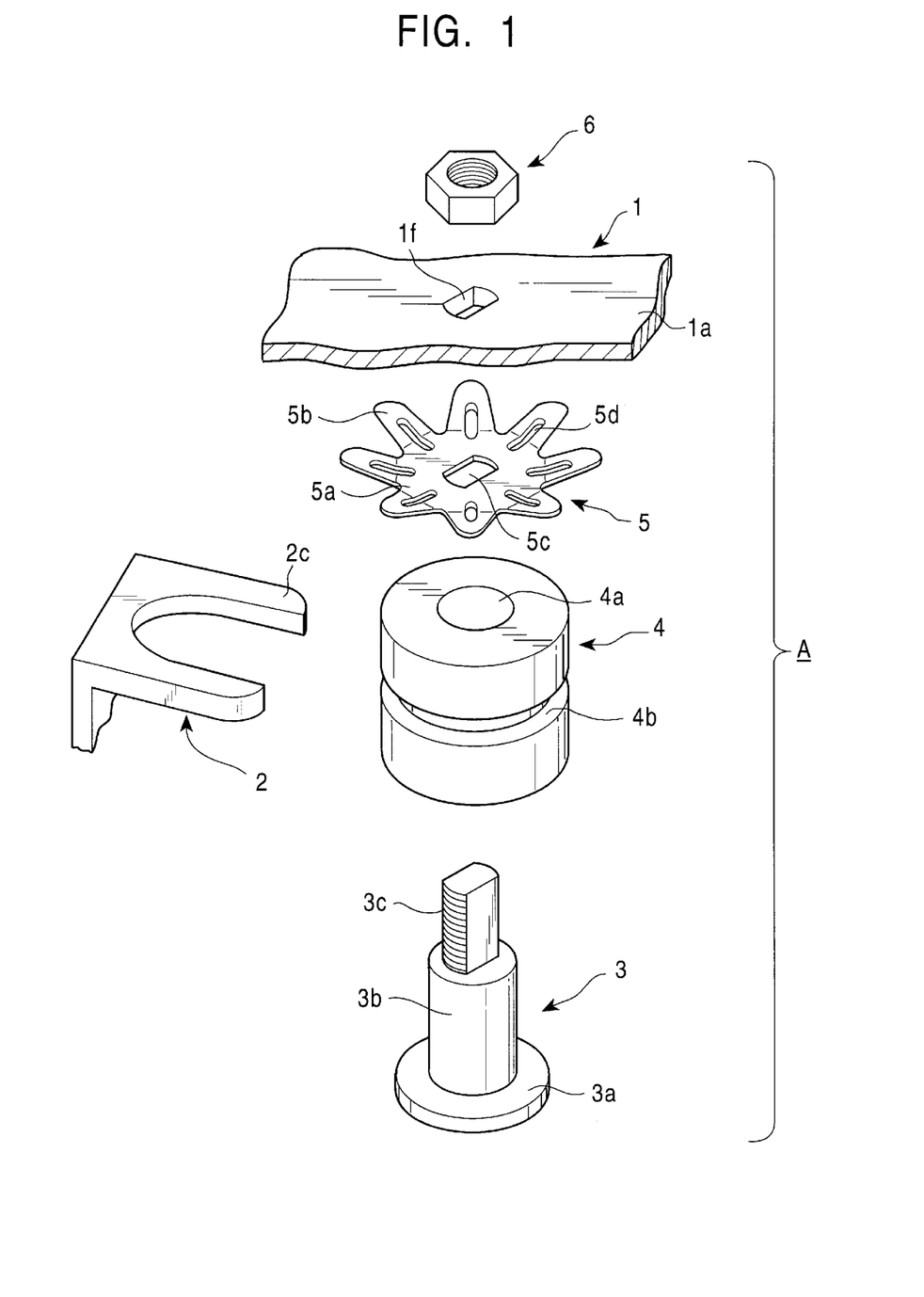
FIG. 1 is an exploded perspective view illustrating an anti-vibration mechanism according to an embodiment of the present invention.
Figure 2:
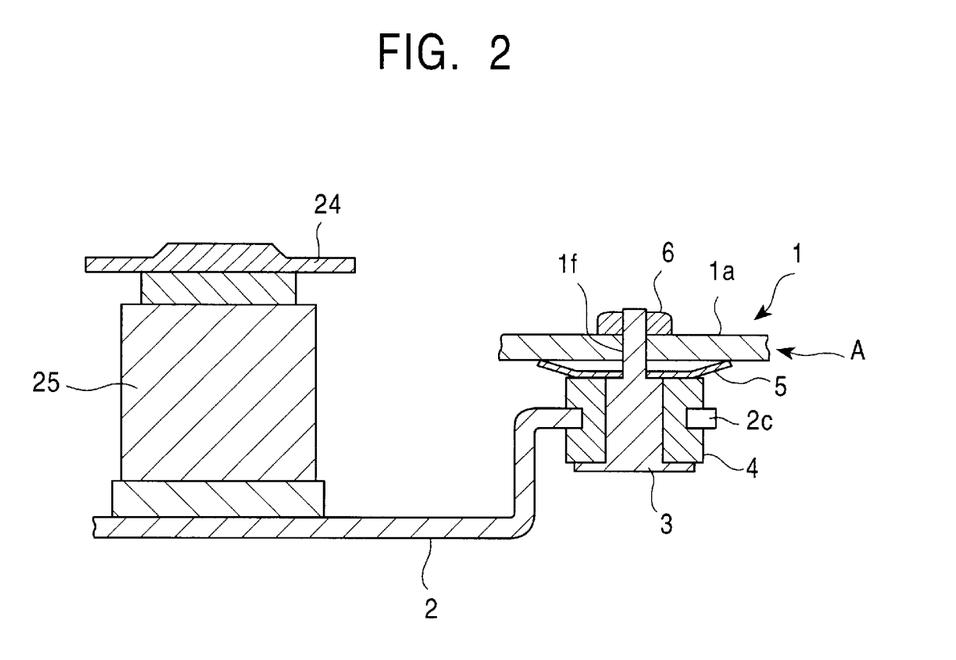
FIG. 2 is an essential-part sectional view illustrating an anti-vibration mechanism according to an embodiment of the present invention.
Figure 3:
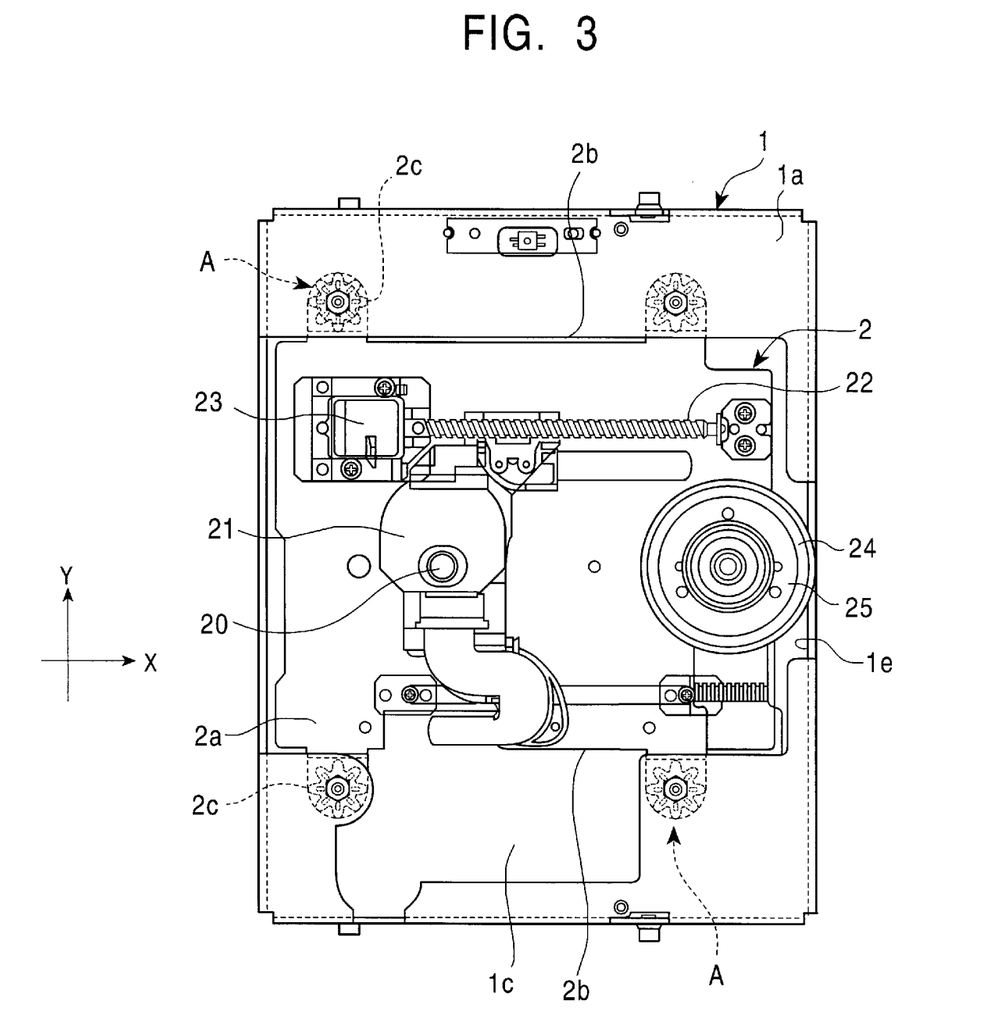
FIG. 3 is a plan view showing a disk drive device according to an embodiment of the present invention.
Figure 4:
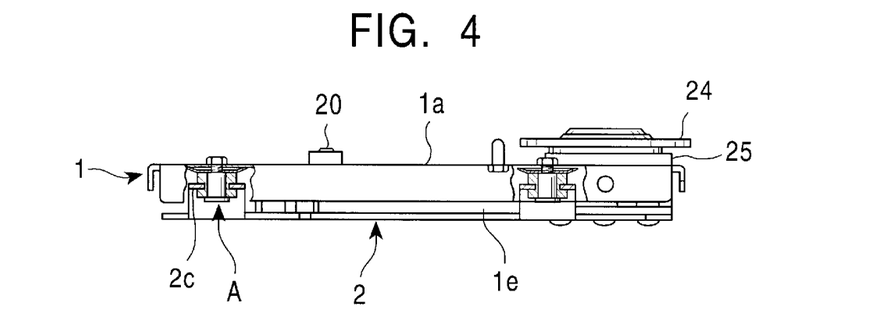
FIG. 4 is a side view showing the disk drive device of FIG. 3.
Figure 5:
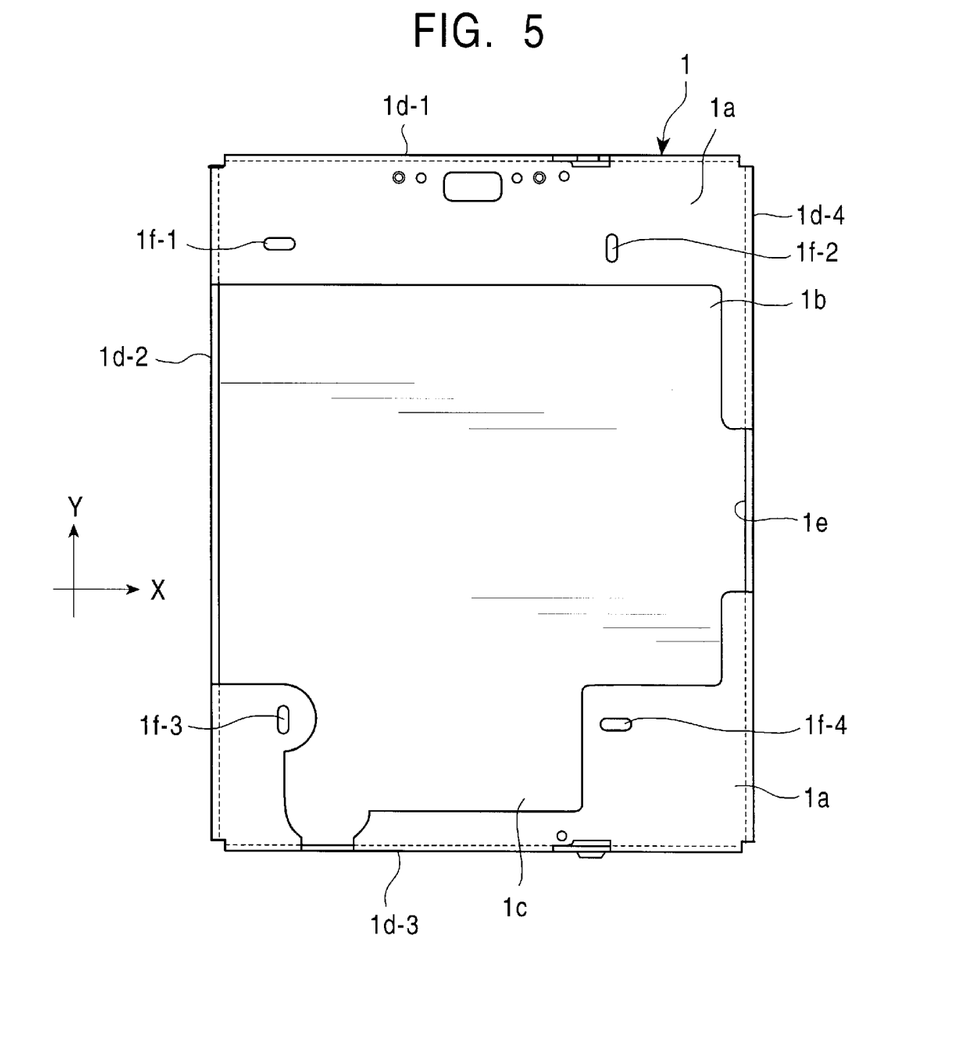
FIG. 5 is a plan view showing a first chassis according to an embodiment of the present invention.
Figure 6:
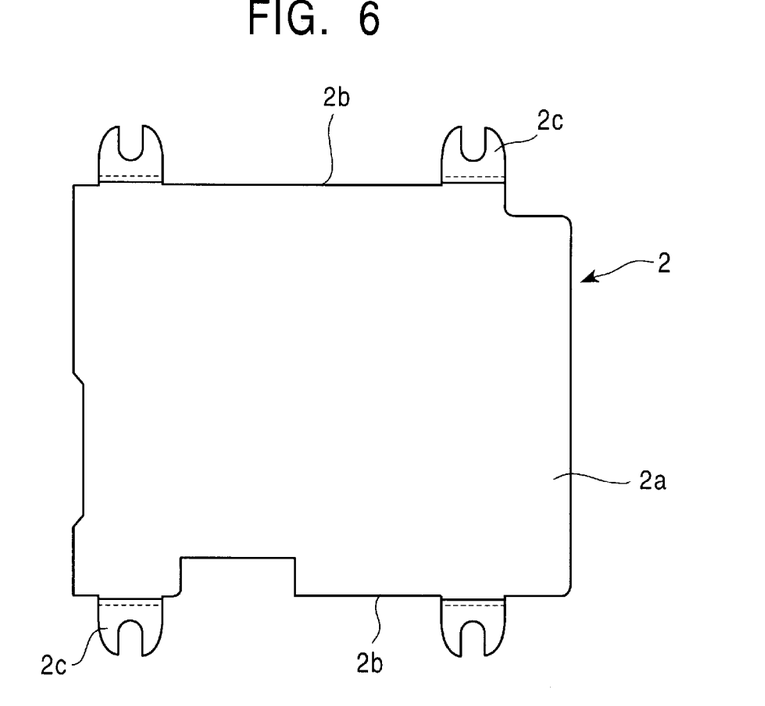
FIG. 6 is a plan view showing a second chassis according to an embodiment of the present invention.

An embodiment of the present invention will now be described in detail with reference to FIGS. 1 through 6. FIG. 1 is an exploded perspective view illustrating an anti-vibration mechanism according to an embodiment of the present invention; FIG. 2 is an essential-part sectional view illustrating an anti-vibration mechanism according to an embodiment of the present invention; FIG. 3 is a plan view showing a disk (e.g., CD-ROM) drive device according to an embodiment of the present invention; FIG. 4 is a side view showing a disk drive device; FIG. 5 is a plan view showing a first chassis according to an embodiment of the present invention; and FIG. 6 is a plan view showing a second chassis according to an embodiment of the present invention.

First, as shown in FIGS. 3 through 6, a first chassis 1 is formed of a metal material, and consists of a box equipped with an upper wall 1a provided on the upper side, a relatively large, substantially rectangular first hole 1b formed substantially at the center of the upper wall 1a, a substantially rectangular second hole 1c connected to the first hole 1b, side walls 1d-1, 1d-2, 1d-3 and 1d-4 provided on the four sides, and an open portion 1e provided on the lower side.

At predetermined positions of the opposed portions of the upper wall 1a extending along the side walls 1d-1 and 1d-3, there are formed a plurality of (for example, two on either side, i.e., four in total) oval holes 1f-1, 1f-2, 1f-3 and 1f-4. The oval holes 1f-1, 1f-2, 1f-3 and 1f-4 are arranged as follows: the oval holes 1f-1 and 1f-2 are aligned in the X-direction like the oval holes 1f-3 and 1f-4 such that their flat surfaces (narrower sides) are orthogonal to each other. At the same time, the oval holes 1f-1 and 1f-3 are aligned in the Y-direction like the oval holes 1f-2 and 1f-4 such that their flat surfaces (narrower sides) are orthogonal to each other.

The oval holes 1f-1, 1f-2, 1f-3 and 1f-4 are formed at proper positions with high dimensional accuracy by, for example, press working.

As shown in FIGS. 3 and 6, the second chassis 2 is formed of a metal material and includes a substantially rectangular holding plate 2a. At the longitudinal side edges 2b of the holding plate 2a, there are formed a plurality of (for example, two on either side, i.e., four in total) mounting members 2c, which are bent upwards into an L-shape and whose forward ends have a fork-like configuration.

On the holding plate 2a of the second chassis 2, there are arranged at least a carriage 21 carrying the above-mentioned reproduction head 20, a screw shaft 22 for driving the carriage 21 in the X-direction, a stepping motor 23 for intermittently driving this screw shaft 22, and a rotation drive motor 25 to which a turntable 24 holding a disk (not shown) is mounted.

The first chassis 1 and the second chassis 2 are opposed to each other, and the oval holes 1f of the first chassis 1 are arranged in correspondence with the mounting members 2c of the second chassis 2.

Thus, the two chassis 1 and 2 are assembled by means of the oval holes 1f and the mounting members 2c, and the reproduction head 20, the carriage 21, the rotation drive motor 25, etc., arranged on the second chassis 2, are exposed through the first hole 1b of the first chassis 1.

Anti-vibration mechanisms A are arranged between the oval holes 1f of the first chassis 1 and the mounting members 2c of the second chassis 2, whereby any vibration of the first chassis 1 is prevented from being transmitted to the second chassis 2.

Next, the anti-vibration mechanism A of this embodiment of the present invention will be described in detail with reference to FIGS. 1 and 2.

First, as shown in FIGS. 1 and 2, a bolt 3, which is a support member constituting the anti-vibration mechanism A of the present invention, consists, for example, of a free-cutting brass bar, and is composed of a disc-like flange portion 3a at the lower end, a cylindrical support portion 3b in the middle having a relatively large diameter, and an oval screw portion 3c at the upper end which has a relatively small diameter and which is formed by cutting off either end thereof (to form flat surfaces).

A vibration proof rubber member 4 formed of a rubber material is substantially cylindrical and has at its center a circular central hole 4a, with a peripheral groove 4b being provided in the outer periphery of the cylindrical body. In this embodiment, a relatively soft rubber material is selected in order to achieve a predetermined spring constant (for example, 18 Kg/cm).

A spring washer 5, which is an elastic member, is formed, for example, of a stainless steel material, and equipped with a holding portion 5a which has, for example, a substantially octagonal configuration, a plurality of (for example, eight) trapezoidal flange portions 5b outwardly extending from the sides of the octagonal holding portion 8a, an oval hole 5c provided at the center of the holding portion 5a, and substantially elongated holes 5d formed in the sections connecting the holding portion 5a to the flange portions 5b and extending outwardly.

The flange portions 5b are bent upwardly at the sections connecting them to the holding portion 5a, and exhibit an elasticity of a predetermined level when their upwardly inclined forward ends are pressed downwardly. Due to the above-mentioned elongated holes 5d, a uniform pressurizing force is applied to the plurality of flange portions 5b to evenly spread out the flange portions 5b.

A hexagon nut 6 is an ordinary hexagon nut commercially available.

In the anti-vibration mechanism A, constructed as described above, the peripheral grooves 4b of the vibration proof rubber members 4 are engaged with a plurality of (for example, four) fork-like mounting members 2c provided on the side edges 2b of the second chassis 2, whereby the vibration proof rubber members 4 are mounted to the mounting members 2c.

The support portion 3b of the bolt 3 is forced into the central hole 4a of the vibration proof rubber member 4 attached to the mounting member 2c, and the oval screw portion 3c of the bolt 3 is passed through the oval hole 5c of the holding portion 5a of the spring washer 5. In this condition, the screw portion 3c is further passed through the oval hole 1f of the first chassis 1, and the hexagon nut 6 is threadedly engaged with the oval screw portion 3c, whereby the anti-vibration mechanism A is constructed.

The holding portion 5a of the spring washer 5a abuts the upper end surface of the support portion 3b of the bolt 3, and the forward ends of the flange portions 5b of the spring washer 5 abut the back surface of the upper wall 1a of the first chassis 1.

Further, due to this anti-vibration mechanism A, the second chassis 2 is suspended from the first chassis 1 through the intermediation of the vibration proof rubber members 4.

The spring constant of the spring washer 5 is set to a very large value as compared to the spring constant of the vibration proof rubber member 4, and there is no concern that any vibration will be generated in the spring washer 5 as a result of vibration, etc. of the first chassis 1.

The configuration of the screw portion 3c of the bolt 3 is not restricted to the oval one. For example, it may also be a D-shaped screw portion with its one end surface cut off. It is naturally only necessary for the screw portion to be a deformed screw portion which is not a so-called round screw portion. It also goes without saying that the configuration of the hole 1f of the first chassis 1 is not restricted to the oval one. It is only necessary for the hole to be a mounting hole formed in correspondence with the configuration of the deformed screw portion of the bolt 3. What is important is that the configuration of the screw portion of the bolt 3 is such that, when it is passed through the mounting hole of the first chassis 1 and threadedly engaged with the nut, the bolt 3 does not rotate (co-rotate) due to the engaging force and that the predetermined deformed portion of the screw portion abuts the predetermined portion of the mounting hole of the first chassis 1 and is held without any clearance.

Next, the adjustment of the height dimension of this anti-vibration mechanism A will be described.

First, when the hexagon nut 6 of the anti-vibration mechanism A, constructed as described above, has been threadedly engaged with the screw portion 3c of the bolt 3, it is possible to spread out or purse up the flange portions 5b of the spring washer 5, abutting the upper end surface of the support portion 3b of the bolt 3, according to the amount by which the hexagon nut 6 is threadedly engaged with the screw portion (i.e., the position of the nut).

According to the position of the forward ends of the flange portions 5b, thus spread out or pursed up, the vibration proof rubber member 4 is moved vertically with respect to the first chassis 1, and as a result of this movement of the vibration proof rubber member 4, the second chassis 2 is moved vertically, so that it is possible to adjust the distance between the upper wall 1a (upper surface) of the first chassis 1 and the upper surface of the turntable 24 mounted to the second chassis 2 (i.e., the height dimension).

Further, since this adjustment of the height dimension can be individually effected for each of the four anti-vibration mechanisms A, the horizontality of the upper surface of the turntable 24, mounted to the second chassis 2, with respect to the upper wall 1a of the first chassis 1 can be easily conducted. Further, correct adjustment of the height dimension can be easily effected.

Further, the force used to threadedly engage the hexagon nut 6 with the screw portion is only applied to the flange portions 5b of the spring washer 5, and no stress due to compressive deformation is applied to the vibration proof rubber member 4. Further, as a result of the abutment of the oval screw portion 3c against the oval hole 1f of the first chassis 1, the rotation of the bolt 3 is restricted, so that the torsion due to the force used for the threaded engagement is not applied to the central hole 4a of the vibration proof rubber member 4. Thus, no torsional deformation is generated in the vibration proof rubber member 4, and no stress due to torsion is applied thereto.

Further, the narrow side surfaces of the oval holes 1f-1 through 1f-4 are formed so as to be orthogonal to each other, so that, when passing the oval screw portions 3c through the oval holes 1f of the first chassis 1, the following advantage is obtained: for example, when the oval screw portions 3c of the bolts 3 are passed through the adjacent oval holes 1f-1 and 1f-2, which are arranged so as to be orthogonal to each other, the positioning in the X-direction of the second chassis 2 with respect to the first chassis 1 is correctly effected (without involving any clearance) since the flat surfaces of the screw portion 3c abut the flat surfaces of one oval hole 1f-2. Further, the positioning in the Y-direction is accurately effected by causing the flat surfaces of the screw portion 3c to come into contact with the flat surfaces of the other oval hole 1f-1.

In this way, the positioning in the X and Y-directions of the second chassis 2 with respect to the first chassis 1 is accurately effected, whereby the central position of the turntable 25 arranged on the second chassis 2 is accurately determined.

As described above, in the anti-vibration mechanism A of the present invention, the distance between the first chassis 1 and the second chassis 2 can be adjusted by using the elasticity of the elastic members, whereby, even when vibration proof members of which the dimensional accuracy in machining is difficult to maintain are used, the dimensional accuracy can be advantageously maintained by adjusting the distance between the first chassis 1 and the second chassis 2 by means of the elastic members.

Further, in the anti-vibration mechanism A of the present invention, deformed screw portions are formed on the support members, and mounting holes having a configuration corresponding to that of the deformed screw portions are formed in the first chassis 1, the deformed screw portions being passed through the mounting holes and the vibration proof members (vibration proof rubber members) attached to the first chassis 1, whereby, when threadedly engaging the nuts 6 with the deformed screw portions, the support members do not rotate (co-rotate) due to the engaging force, so that no torsional stress is applied to the vibration proof members (vibration proof rubber members). Thus, there is no concern that the spring constant of the vibration proof members will change, whereby the initially set spring constant can be maintained in a stable manner.

Further, in the anti-vibration mechanism A of the present invention, the orientation of the flat surfaces of the plurality of mounting holes formed in the first chassis 1 is arranged such that they are orthogonal to each other, whereby the flat surfaces of the deformed screw portions of the support members, attached to the mounting holes, come into contact with the flat surfaces of the mounting holes without involving any clearance, so that the positioning in the X and Y-directions of the second chassis 2 with respect to the first chassis 1 can be advantageously correctly effected.

Further, in the anti-vibration mechanism A of the present invention, the elastic members are spring washers, which makes it possible to obtain inexpensive, accurate members by press working or the like.

As described above, in the disk drive device of the present invention, it is possible to adjust the distance between the upper surface of the turntable and the upper wall 1a (upper surface) of the first chassis I by using the elasticity of the elastic members for each anti-vibration mechanism A, whereby the distance between the upper surface of the turntable 24 and the upper wall 1a of the first chassis 1 can be accurately obtained, and the parallelism between the upper surfaces can be advantageously easily set.

Further, in the disk drive device of the present invention, even when variation in the heights of the anti-vibration mechanisms A is generated as a result of changes with time, and the parallelism of the upper surface of the turntable cannot be maintained, the height dimension of each anti-vibration mechanism A can be adjusted again, whereby the inclination of the turntable can be easily corrected, and a stable performance can be maintained for a long period of time.

What is claimed is:

1. An anti-vibration mechanism comprising: a first chassis; a second chassis opposed to the first chassis; vibration proof members mounted to the second chassis; support members for mounting the vibration proof members to the first chassis; and elastic members arranged between the first chassis and the support members, wherein deformed screw portions are formed on the support members, and wherein mounting holes having a configuration corresponding to the deformed screw portions are formed in the first chassis, the deformed screw portions being passed through the mounting holes to thereby mount the vibration proof members to the first chassis, and wherein the second chassis is suspended from the first chassis through the intermediation of the vibration proof members and wherein the distance between the first chassis and the second chassis can be adjusted by means of the elastic members.

2. An anti-vibration mechanism according to claim 1, wherein flat surfaces are provided on the deformed screw portions, and wherein a plurality of said mounting holes are formed, with the orientations of flat surfaces of at least two of the mounting holes being arranged so as to be orthogonal to each other.

3. The anti-vibration mechanism of claim 1, wherein each elastic member has a plurality of flange portions uniformly and radially formed.

4. The anti-vibration mechanism of claim 3, wherein the flange portions have an elasticity sufficient to absorb variations in height between different support members and the corresponding elastic member such that a height difference between the first chassis and a position in which the second chassis is suspended at each corresponding support member is constant over all support members, the flange portions absorbing the variations in height between different support members and the corresponding elastic member by being deflected.

5. The anti-vibration mechanism of claim 1, the deformed screw portions comprising parallel flat surfaces formed from at least a portion of outer peripheral surfaces of screw portions of the support members,
   wherein the mounting holes are formed as elongated holes having linear portions in conformity with the deformed screw portions.

6. The anti-vibration mechanism of claim 5, wherein four mounting holes are formed in the first chassis, each mounting hole being formed in a unique corner of the first chassis and formed the linear portions of adjacent mounting holes are perpendicular to each other, the deformed screw portions being passed through the mounting holes to thereby mount the vibration proof members to the first chassis, and the flat surfaces of the mounting holes respectively abutting the corresponding linear portions of the deformed screw portions to thereby position the second chassis with respect to the first chassis when the deformed screw portions are fastened.

7. An anti-vibration mechanism comprising:
   a first chassis;
   a second chassis opposed to the first chassis;
   vibration proof members mounted to the second chassis;
   support members for mounting the vibration proof members to the first chassis; and
   elastic members arranged between the first chassis and the support members, each elastic member having a plurality of flange portions uniformly and radially formed,
   wherein deformed screw portions are formed on the support members, and
   wherein mounting holes having a configuration corresponding to the deformed screw portions are formed in the first chassis, the deformed screw portions being passed through the mounting holes to thereby mount the vibration proof members to the first chassis, and
   wherein the second chassis is suspended from the first chassis through the intermediation of the vibration proof members, and
   wherein the flange portions have an elasticity sufficient to absorb variations in height between different support members and the corresponding elastic member such that a height difference between the first chassis and a position in which the second chassis is suspended at each corresponding support member is constant over all support members, the flange portions absorbing the variations in height between different support members and the corresponding elastic member by being deflected, and
   wherein a distance between the first chassis and the second chassis adjustable by the elastic members.

8. An anti-vibration mechanism comprising:
   a first chassis;
   a second chassis opposed to the first chassis;
   vibration proof members mounted to the second chassis;
   support members to mount the vibration proof members to the first chassis and having screw portions;
   deformed screw portions formed on the support members, the deformed screw portions provided with opposed flat surfaces formed by partially cutting off outer peripheral surfaces of the screw portions to form bar-like screw portions; and
   elastic members arranged between the first chassis and the support members,
   wherein the mounting holes are formed as elongated holes having linear portions in conformity with an outer configuration of the deformed screw portions, the mounting holes being formed in four corners of the first chassis such that orientations of the linear portions of adjacent mounting holes are perpendicular to each other, the deformed screw portions being passed through the mounting holes to thereby mount the vibration proof members to the first chassis, and when the deformed screw portions are fastened, the flat surfaces of the mounting holes respectively abut the corresponding linear portions of the deformed screw portions to thereby effect positioning of the second chassis with respect to the first chassis, and
   wherein the second chassis is suspended from the first chassis through the intermediation of the vibration proof members, and
   wherein a distance between the first chassis and the second chassis can be adjusted by the elastic members.

* * * * *